United States Patent
More et al.

(10) Patent No.: US 10,262,131 B2
(45) Date of Patent: Apr. 16, 2019

(54) SYSTEMS AND METHODS FOR OBTAINING INFORMATION ABOUT SECURITY THREATS ON ENDPOINT DEVICES

(71) Applicant: Symantec Corporation, Mountain View, CA (US)

(72) Inventors: Priti More, Pune (IN); Kovid Agarwal, Uttar Pradesh (IN); Sujit Magar, Shrirampur (IN)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 15/148,019

(22) Filed: May 6, 2016

(65) Prior Publication Data

US 2017/0279819 A1 Sep. 28, 2017

(30) Foreign Application Priority Data

Mar. 22, 2016 (IN) .............................. 201621009947

(51) Int. Cl.
*G06F 21/55* (2013.01)
*H04L 29/06* (2006.01)
*H04L 12/26* (2006.01)

(52) U.S. Cl.
CPC .............. *G06F 21/55* (2013.01); *H04L 63/02* (2013.01); *H04L 63/1408* (2013.01);
(Continued)

(58) Field of Classification Search
CPC ....... H04L 43/04; H04L 43/062; H04L 63/02; H04L 63/1408; H04L 63/1425; G06F 21/55

See application file for complete search history.

(56) References Cited

U.S. PATENT DOCUMENTS 6,721,721 B1 * 4/2004 Bates .................... G06F 21/562
8,001,606 B1 * 8/2011 Spertus ................ G06F 21/564
709/203

(Continued)

OTHER PUBLICATIONS

Kevin Roundy, et al.; Systems and Methods for Determining the Trustworthiness of Files Within Organizations; U.S. Appl. No. 14/753,051, filed Jun. 29, 2015.

(Continued)

*Primary Examiner* — Theodore C Parsons
*Assistant Examiner* — Carlos M De Jesus Lassala
(74) *Attorney, Agent, or Firm* — FisherBroyles, LLP

(57) ABSTRACT

The disclosed computer-implemented method for obtaining information about security threats on endpoint devices may include (1) detecting, by a security program on a computing device, an attempt to access at least one suspicious file, (2) before permitting the computing device to access the suspicious file, identifying, by the security program, at least one third-party resource not associated with the security program that contains information potentially indicative of the trustworthiness of the suspicious file, (3) obtaining, by the security program from the third-party resource, the information potentially indicative of the trustworthiness of the suspicious file, and then (4) determining, by the security program based at least in part on the information potentially indicative of the trustworthiness of the suspicious file, whether the suspicious file represents a security threat to the computing device. Various other methods, systems, and computer-readable media are also disclosed.

20 Claims, 6 Drawing Sheets

(52) U.S. Cl.
CPC .......... *H04L 63/1425* (2013.01); *H04L 43/04* (2013.01); *H04L 43/062* (2013.01)

(56) References Cited

U.S. PATENT DOCUMENTS

| | | | |
|---|---|---|---|
| 8,250,657 B1* | 8/2012 | Nachenberg | G06F 21/577 |
| | | | 705/50 |
| 8,650,649 B1* | 2/2014 | Chen | G06F 21/64 |
| | | | 726/22 |
| 9,111,089 B1* | 8/2015 | Bhatia | G06F 21/00 |
| 9,223,961 B1* | 12/2015 | Sokolov | G06F 21/51 |
| 9,450,764 B1* | 9/2016 | Savant | H04L 9/3268 |
| 9,560,028 B1* | 1/2017 | Salehpour | H04L 63/08 |
| 9,679,134 B1* | 6/2017 | Jing | G06F 21/56 |
| 9,918,873 B2* | 3/2018 | Woodley | A61B 3/102 |
| 2011/0225655 A1* | 9/2011 | Niemela | G06F 21/566 |
| | | | 726/24 |
| 2012/0110174 A1* | 5/2012 | Wootton | G06F 21/564 |
| | | | 709/224 |
| 2012/0192275 A1* | 7/2012 | Oliver | G06F 21/51 |
| | | | 726/24 |
| 2012/0240236 A1* | 9/2012 | Wyatt | G06F 21/564 |
| | | | 726/25 |
| 2014/0215620 A1* | 7/2014 | Hayrynen | H04L 63/1416 |
| | | | 726/23 |
| 2017/0237754 A1* | 8/2017 | Todorovic | H04L 9/3247 |
| | | | 713/156 |

OTHER PUBLICATIONS

Lei Gu, et al.; Systems and Methods for Efficient Backup Deduplication; U.S. Appl. No. 14/992,237, filed Jan. 11, 2016.

Ilya Sokolov, et al.; Systems and Methods for Performing Human-Verification Procedures; U.S. Appl. No. 15/065,924, filed Mar. 10, 2016.

"Revocation list", https://en.wikipedia.org/wiki/Revocation_list, as accessed Feb. 4, 2016, Wikipedia, (Aug. 24, 2009).

* cited by examiner

SYSTEMS AND METHODS FOR OBTAINING INFORMATION ABOUT SECURITY THREATS ON ENDPOINT DEVICES

Organizations and individuals often implement various types of security services to protect computing devices against malware, viruses, intrusions, and other security threats. Traditional security services may detect potential security threats on a computing device in a variety of ways, such as by comparing files accessed by the computing device with known malware signatures and/or determining whether the files are included on a blacklist of blocked files (or a whitelist of allowed files).

Specifically, in response to detecting an attempt by an endpoint device to access a suspicious file, a traditional security service that operates on the endpoint device may search databases maintained by the security service to identify existing information about the trustworthiness of the file. Unfortunately, in the event that the databases do not contain information about the file, the security service may be unable to determine whether the file represents a security threat to the computing device. The instant disclosure, therefore, identifies and addresses a need for improved systems and methods for obtaining information about security threats on endpoint devices.

SUMMARY

As will be described in greater detail below, the instant disclosure describes various systems and methods for obtaining information about security threats on endpoint devices by directing a security service to retrieve information about the origin of a suspicious file and/or potentially malicious behaviors exhibited by the file from third-party resources that are not associated with the security service.

In one example, a computer-implemented method for performing such a task may include (1) detecting, by a security program on a computing device, an attempt to access at least one suspicious file, (2) before permitting the computing device to access the suspicious file, identifying, by the security program, at least one third-party resource not associated with the security program that contains information potentially indicative of the trustworthiness of the suspicious file, (3) obtaining, by the security program from the third-party resource, the information potentially indicative of the trustworthiness of the suspicious file, and then (4) determining, by the security program based at least in part on the information potentially indicative of the trustworthiness of the suspicious file, whether the suspicious file represents a security threat to the computing device.

In some examples, detecting the attempt to access the suspicious file may include detecting an attempt to access a file whose trustworthiness is unknown. Additionally, in some embodiments, identifying the third-party resource may include identifying a creator, a publisher, and/or a distributor of the suspicious file.

In some examples, the information potentially indicative of the trustworthiness of the suspicious file may include information indicating malicious behaviors the suspicious file may exhibit while running on the computing device. Additionally or alternatively, the trustworthiness information of the suspicious file may include information indicating that the suspicious file was created with malicious intent. Furthermore, in some embodiments, obtaining the trustworthiness information of the suspicious file may include performing a web search for the third-party resource and/or crawling a web page hosted by the third-party resource.

In some examples, the method may include determining that the suspicious file represents the security threat based on determining that the information obtained from the third-party resource indicates that the suspicious file is not trustworthy. In these examples, the method may further include performing at least one security action on the suspicious file. In other examples, the method may include determining that the suspicious file does not represent the security threat based on determining that the information obtained from the third-party resource indicates that the suspicious file is trustworthy. In these examples, the method may further include permitting the computing device to access the suspicious file.

In some embodiments, after determining whether the suspicious file represents the security threat, the method may further include sending, to a remote security service that manages the security program, information about the determination of whether the suspicious file represents the security threat. In such embodiments, the method may also include prompting the security service to generate at least one security policy associated with the suspicious file that is to be implemented on at least one additional computing device.

In one embodiment, a system for implementing the above-described method may include (1) a detection module that detects, as part of a security program on a computing device, an attempt to access at least one suspicious file, (2) an identification module that identifies, as part of the security program, before the computing device is permitted to access the suspicious file, at least one third-party resource not associated with the security program that contains information potentially indicative of the trustworthiness of the suspicious file, (3) an information module that obtains, from the third-party resource, as part of the security program, the information potentially indicative of the trustworthiness of the suspicious file, and (4) a determination module that determines, as part of the security program, based at least in part on the information potentially indicative of the trustworthiness of the suspicious file, whether the suspicious file represents a security threat to the computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, by a security program on the computing device, an attempt to access at least one suspicious file, (2) before permitting the computing device to access the suspicious file, identify, by the security program, at least one third-party resource not associated with the security program that contains information potentially indicative of the trustworthiness of the suspicious file, (3) obtain, by the security program from the third-party resource, the information potentially indicative of the trustworthiness of the suspicious file, and then (4) determine, by the security program based at least in part on the information potentially indicative of the trustworthiness of the suspicious file, whether the suspicious file represents a security threat to the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
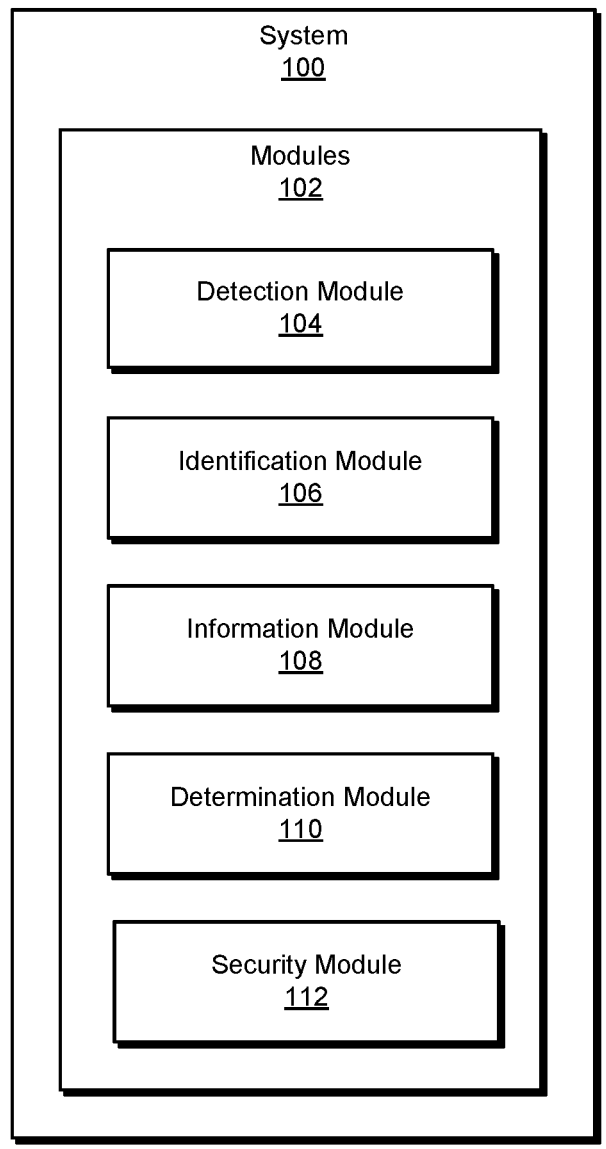
FIG. 1 is a block diagram of an exemplary system for obtaining information about security threats on endpoint devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for obtaining information about security threats on endpoint devices. As will be explained in greater detail below, the disclosed systems and methods may enable a security service to identify and access third-party resources not associated with the security service to obtain information relevant to the trustworthiness of a suspicious file. As such, the systems and methods described herein may enable the security service to accurately and efficiently determine the trustworthiness of the file, even if the security service does not store previously-identified information (such as malware signatures and/or reputation information about the file) that indicates whether the file is legitimate or malicious.

Figure 2:
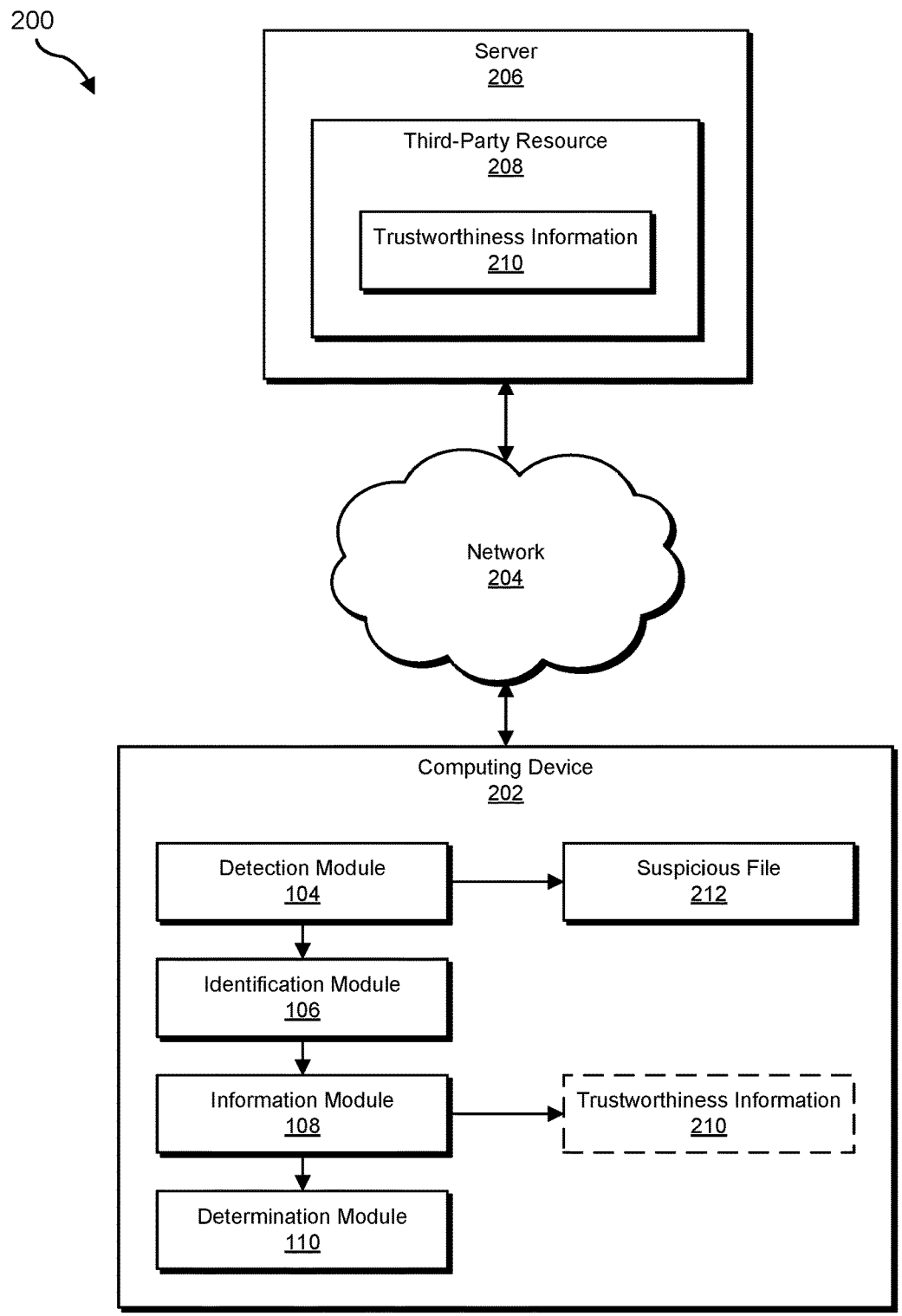
FIG. 2 is a block diagram of an additional exemplary system for obtaining information about security threats on endpoint devices.
Figure 3:
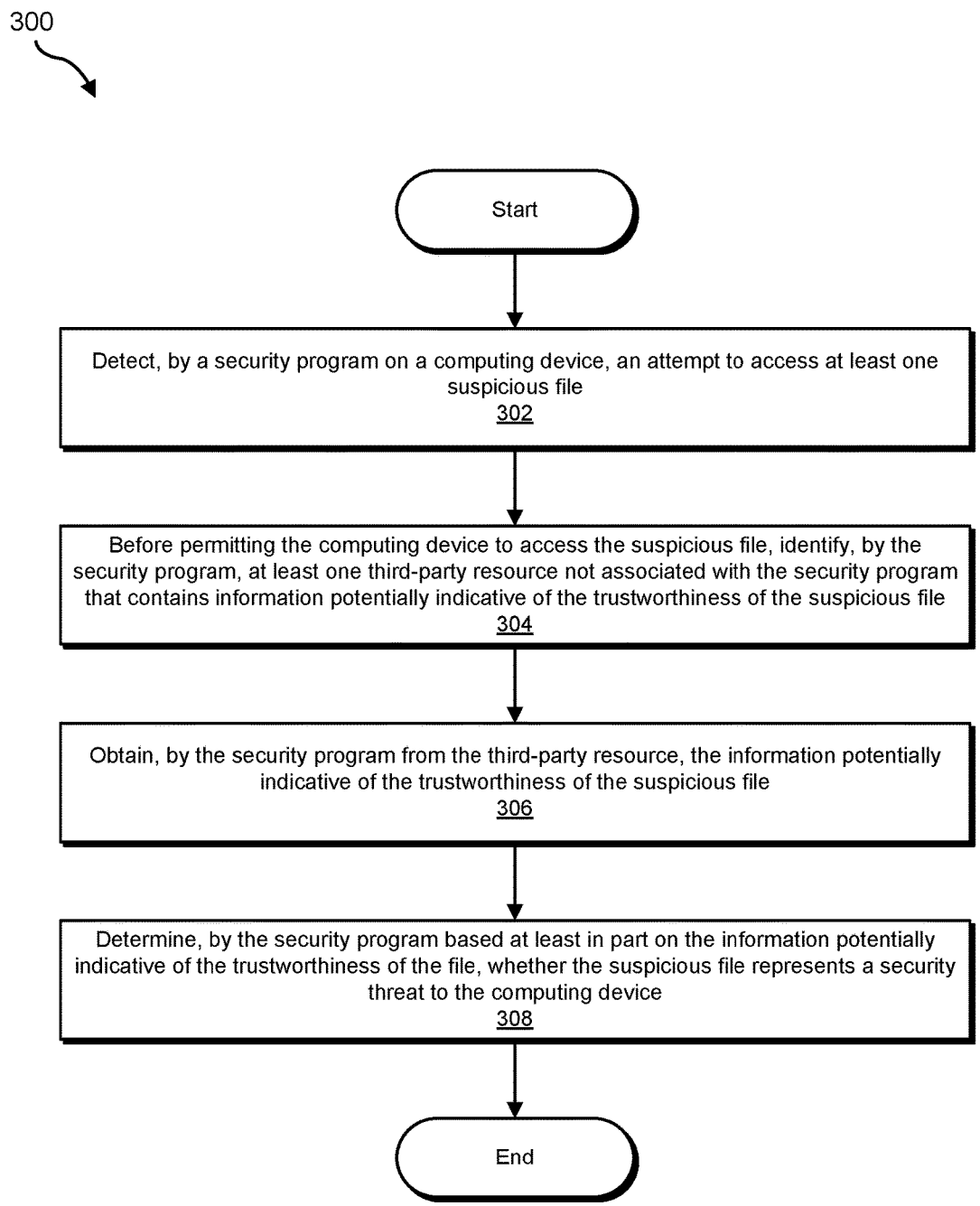
FIG. 3 is a flow diagram of an exemplary method for obtaining information about security threats on endpoint devices.
Figure 4:
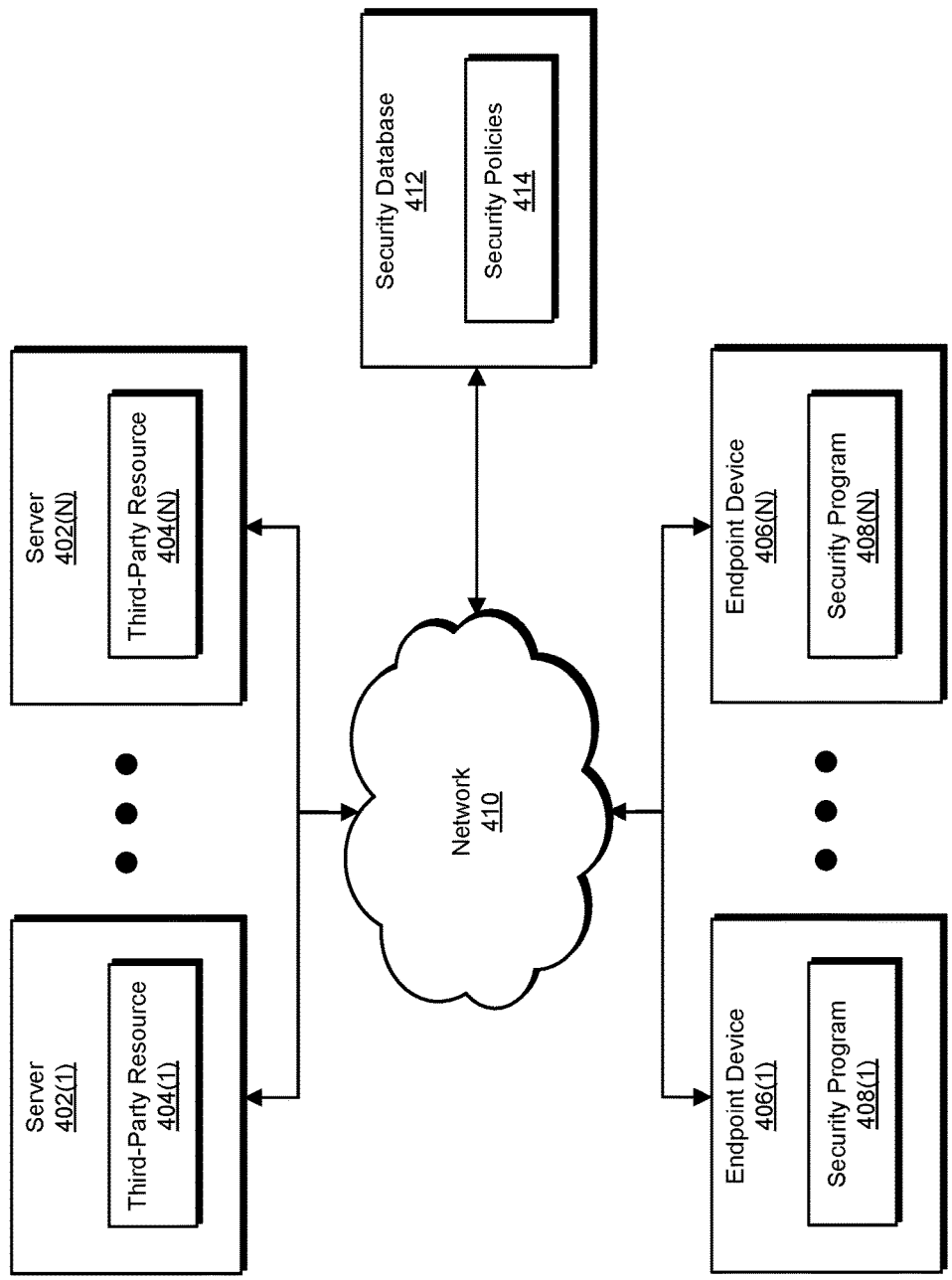
FIG. 4 is a block diagram of an additional exemplary system for obtaining information about security threats on endpoint devices.

The following will provide, with reference to FIGS. 1, 2, and 4, detailed descriptions of exemplary systems for obtaining information about security threats on endpoint devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for obtaining information about security threats on endpoint devices. As illustrated in this figure, exemplary system 100 may include one or more modules 102 for performing one or more tasks. For example, and as will be explained in greater detail below, exemplary system 100 may include a detection module 104 that detects, as part of a security program on a computing device, an attempt to access at least one suspicious file. Exemplary system 100 may also include an identification module 106 that identifies, as part of the security program, before the computing device is permitted to access the suspicious file, at least one third-party resource not associated with the security program that contains information potentially indicative of the trustworthiness of the suspicious file.

In addition, and as will be described in greater detail below, exemplary system 100 may include an information module 108 that obtains, from the third-party resource, as part of the security program, the information potentially indicative of the trustworthiness of the suspicious file. Exemplary system 100 may also include a determination module 110 that determines, as part of the security program, based at least in part on the information potentially indicative of the trustworthiness of the suspicious file, whether the suspicious file represents a security threat to the computing device. Finally, exemplary system 100 may include a security module 112 that performs one or more security actions in response to the determination of whether the suspicious file represents the security threat. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In this example, server 206 may host a third-party resource 208. Furthermore, as shown in FIG. 2, computing device 202 may be programmed with one or more of modules 102. In some examples, modules 102 may operate as part of a security program installed on computing device 202.

The term "security program," as used herein, generally refers to any type or form of software, application, or executable code dedicated to protecting a computing device against malware, viruses, intrusions, unsecure network connections, and/or any additional security threat. In some examples, a security program may run in the background of a computing device to detect and prevent attempts by the computing device to access potentially harmful computing resources (e.g., malicious files and websites). Furthermore, a security program on an endpoint device may be in communication with and/or managed by a central security server or database. The central server may assist the security program in protecting the endpoint device in a variety of ways, such as by providing information about the reputation of files accessed by the endpoint device and/or enforcing security policies on the endpoint device.

In one embodiment, one or more of modules 102 from FIG. 1 may, when executed by at least one processor of computing device 202, enable computing device 202 to obtain information about security threats on computing device 202. For example, and as will be described in greater detail below, detection module 104 may, as part of a security program on computing device 202, cause computing device 202 to detect an attempt to access a suspicious file 212. Before computing device 202 is permitted to access suspicious file 212, identification module 106 may, as part of the security program, cause computing device 202 to identify third-party resource 208 that is not associated with the security program. Third-party resource 208 may contain trustworthiness information 210 that potentially indicates the trustworthiness of suspicious file 212. Next, information module 108 may, as part of the security program, cause computing device 202 to obtain trustworthiness information 210 from third-party resource 208. Finally, determination module 110 may, as part of the security program, cause computing device 202 to determine whether suspicious file 212 represents a security threat to computing device 202 based at least in part on trustworthiness information 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of hosting, storing, and/or providing information relevant to the origin, background, and/or operation of a file. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for obtaining information about security threats on endpoint devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect, by a security program on a computing device, an attempt to access at least one suspicious file. For example, detection module 104 may, as part of a security program on computing device 202 in FIG. 2, detect an attempt to access suspicious file 212.

The term "file," as used herein, generally refers to any type or form of formatted data including, without limitation, executable code, an application, a database or database entry, and/or an electronic document. In addition, the term "suspicious file," as used herein, generally refers to any file that has an unknown or unverified level of trustworthiness or legitimacy. Examples of suspicious files include, without limitation, files originating from unknown or unverified sources, files that have not been authenticated by a certificate authority, and/or files that may potentially exhibit malicious behaviors. Additionally or alternatively, a suspicious file may represent any file that the systems described herein have not yet analyzed to determine whether the file represents a security threat.

The systems described herein may detect an attempt to access a suspicious file in a variety of ways. In some examples, detection module 104 may monitor a computing device to detect any attempt by the computing device and/or a user of the computing device to download, install, open, view, or otherwise access a file. Specifically, detection module 104 may detect an attempt to download a file from an electronic message, view a file on a website, and/or copy a file from a removable storage device. Before permitting a computing device to complete such an attempt to access a file, detection module 104 may determine whether the file is legitimate (e.g., by determining that the file is included on a whitelist of files known to be legitimate) or suspicious. In the event that detection module 104 determines that a computing device is attempting to access a suspicious file, detection module 104 may block the computing device from accessing the file until the systems described herein perform one or more analyses (described below) to determine whether the file is trustworthy.

Returning to FIG. 3, at step 304 one or more of the systems described herein may, as part of the security program, before permitting the computing device to access the suspicious file, identify at least one third-party resource not associated with the security program that contains information potentially indicative of the trustworthiness of the suspicious file. For example, identification module 106 may, as part of the security program on computing device 202, before computing device 202 is permitted to access suspicious file 212, identify third-party resource that contains trustworthiness information 210.

The term "third-party resource," as used herein, generally refers to any type or form of resource that stores or provides information indicative of the trustworthiness of one or more files and is not associated with and/or managed by a security program or service. For example, a security service may maintain or have access to resources (e.g., databases) that store information (e.g., reputation scores, malware signatures, etc.) used to determine the trustworthiness of various files. A third-party resource, from the perspective of the security service, may represent any database, entity, server, or other resource that is independent from and/or not controlled by the security service. Accordingly, a third-party resource may be hosted within a separate network, computing cloud, and/or group of servers than a security service.

In some examples, a third-party resource may be directly associated with a file about which it provides information. Examples of such resources may include webpages or services managed by a creator, developer, and/or publisher of a file. Alternatively, a third-party resource may contain information provided by third-party users that are not responsible for generating the file. Examples of these types of resources may include public databases or forums (e.g., VIRUSTOTAL, HERDPROTECT, etc.) that contain information crowd-sourced from various users. In general, a third-party resource may represent any type or form of independent resource that provides information relevant to the operation of a file (e.g., behaviors exhibited by the file), the origin of a file (e.g., a source of the file), and/or the intent of the file (e.g., whether the file was created maliciously or for legitimate purposes).

The systems described herein may identify a third-party resource that contains information potentially indicative of the trustworthiness of a suspicious file in a variety of ways. In some examples, identification module 106 may identify a third-party resource associated with a file by searching the file for information indicating an origin of the file. For example, identification module 106 may search a header of the file and/or a signature attached to the file to identify an individual or organization responsible for generating the file. Additionally or alternatively, identification module 106 may identify a third-party resource by analyzing a platform or user interface that a user viewed during an attempt to access the file. For example, identification module 106 may identify an entity responsible for distributing or generating the file by analyzing an electronic message or a website that provides a link to download the file. Similarly, identification module 106 may identify one or more vendors that distribute the file. For example, identification module 106 may identify an application distribution platform from which a user is attempting to download the file, as well as any additional application distribution platforms that host the file for download. Furthermore, in some examples, identification module 106 may identify any and/or all public databases that store information about the trustworthiness of the file.

In some embodiments, identification module 106 may perform an initial analysis of a suspicious file before identifying third-party resources that provide information about the file. For example, after detection module 104 detects an attempt to access a suspicious file, identification module 106 may first determine whether the security program that includes modules 102 (or a remote security service that manages the security program) contains previously-identified information indicative of the trustworthiness of the file. In the event that the security program is unable to determine whether the file represents a security threat based on existing information within the security program, identification module 106 may proceed with identifying one or more third-party resources that may provide information sufficient to determine the trustworthiness of the file.

Returning to FIG. 3, at step 306 one or more of the systems described herein may obtain, from the third-party resource, as part of the security program, the information potentially indicative of the trustworthiness of the suspicious file. For example, information module 108 may, as part of the security program on computing device 202, obtain trustworthiness information 210 from third-party resource 208.

The term "trustworthiness information," as used herein, generally refers to any type or form of information that may indicate whether a file is trusted or untrusted. The term "untrusted file," as used herein, generally refers to any file that may compromise the integrity and/or security of a computing device. In some examples, a file may be untrusted if it originates from an unverified and/or malicious source. Additionally or alternatively, an untrusted file may exhibit one or more unexpected or harmful behaviors. In contrast, the term "trusted file," as used herein, generally refers to any file that is known or presumed to be benign, legitimate, and/or useful to the operation of a computing device.

The systems described herein may obtain trustworthiness information from a third-party resource in a variety of ways. In some examples, after identifying a third-party resource that potentially contains trustworthiness information about a file, information module 108 may access the third-party resource. For example, information module 108 may perform a web search to identify a website associated with the third-party resource. In other examples, information module 108 may directly connect to a server or other computing device that hosts the third-party resource.

After accessing a third-party resource, information module 108 may analyze content provided by the resource to identify trustworthiness information associated with a suspicious file. In some embodiments, information module 108 may search a third-party resource for a specific piece of information that information module 108 has determined the third-party resource likely contains and will be useful in determining whether a suspicious file is trustworthy. For example, information module 108 may search a website provided by a publisher of a suspicious file for an End User License Agreement (EULA) associated with the file. A EULA (or similar document) may provide information about the expected and/or allowed behaviors of a file while the file runs on a computing device. As another example, information module 108 may search a public security database for references to a suspicious file. Specifically, information module 108 may determine whether a certificate revocation list indicates that the certificate of a suspicious file has been revoked. In a further example, information module 108 may search one or more application distribution platforms to determine whether the platforms host a suspicious file for download. Moreover, in addition to or instead of searching a third-party resource for a specific piece or type of information, information module 108 may comb through, crawl, or parse the content of a third-party resource to identify any information that may potentially be relevant to the trustworthiness of a file.

In some examples, information module 108 may retrieve trustworthiness information about a suspicious file after identifying the information within a third-party resource. For example, information module 108 may copy the information and/or provide the information to determination module 110 for further analysis. Notably, information module 108 may identify and retrieve information from a third-party resource about a file that a user has attempted to access without disrupting the user's interactions with their computing device. For example, information module 108 may direct a backend security server to access the third-party resource and search the third-party resource for trustworthiness information about the file. The backend security server may perform necessary actions or analyses (e.g., rendering and searching webpages) without interfering with any content or user interfaces displayed on the user's device and/or without consuming software or hardware resources on the user's device.

Returning to FIG. 3, at step 308 one or more of the systems described herein may determine, as part of the security program, based at least in part on the information potentially indicative of the trustworthiness of the suspicious file, whether the suspicious file represents a security threat to the computing device. For example, determination module 110 may, as part of the security program on computing device 202, determine, based at least in part on trustworthiness information 210, whether suspicious file 212 represents a security threat to computing device 202.

The term "security threat," as used herein, generally refers to any type or form of file that compromises the security and/or performance of a computing device. Examples of security threats include, without limitation, malware, viruses, Trojan horses, rootkits, bots, adware, spyware, and spam.

The systems described herein may determine whether a suspicious file represents a security threat in a variety of ways. In some examples, determination module 110 may analyze trustworthiness information retrieved by information module 108 to determine whether the trustworthiness information indicates that a suspicious file was created with malicious intent and/or by a malicious entity. For example, determination module 110 may determine that a suspicious file is untrustworthy based on determining that retrieved trustworthiness information indicates that the suspicious file is likely to perform harmful and/or unexpected behaviors on a computing device. As a specific example, determination module 110 may determine that a suspicious file is untrustworthy in the event that a EULA associated with the file indicates that the file will access private and/or sensitive data on a computing device that is not necessary to the operation of the file.

Additionally or alternatively, determination module 110 may determine that a suspicious file is untrustworthy based on determining that retrieved trustworthiness information indicates that the source of the file is illegitimate (e.g., that the source is known to distribute malware or that the true source of the file is not the source claimed by the file). For example, determination module 110 may determine that a file is untrustworthy in the event that at least a certain number of vendors host the file for download and/or in the event that multiple vendors that host the file for download claim that the file originated from varying sources.

Furthermore, determination module 110 may determine that a suspicious file is untrustworthy based on determining that retrieved trustworthiness information indicates that previous users of the file have identified malicious characteristics of the file. For example, determination module 110 may determine that a file is untrustworthy in the event that a public security forum that crowdsources information from various users indicates that the file has negatively affected one or more additional computing devices.

Determination module 110 may apply any type or form of analysis, algorithm, or set of rules to obtained trustworthiness information to determine whether the trustworthiness information indicates that a file represents a security threat. For example, determination module 110 may implement a predefined algorithm to identify particular strings within documents or text associated with a file (such as a EULA or a reference to the file on a public forum). In another example, determination module 110 may use various encryption and/or decryption algorithms to analyze certificates or signatures attached to third-party resources. Furthermore, in some examples, determination module 110 may implement one or more of the above analyses or techniques on trustworthiness information obtained from multiple third-party resources to obtain a comprehensive assessment of any malicious properties of a file.

The systems described herein may perform one or more security actions in response to determining whether a suspicious file represents a security threat. For example, in the event that determination module 110 determines that a computing device is attempting to access a trustworthy file, security module 112 may allow the attempt. Specifically, security module 112 may permit the computing device to download, view, install, or otherwise obtain the file. Additionally, in some examples, security module 112 may present, to a user of the computing device, a user interface that notifies the user that the file has been verified as trustworthy.

In the event that determination module 110 determines that a computing device is attempting to access an untrustworthy file, security module 112 may perform one or more actions to prevent the computing device from accessing the file. For example, security module 112 may block, deny, or cancel the attempt to access the file. Specifically, security module 112 may terminate a connection between the computing device and a server that hosts the file and/or prevent the computing device from executing any processes involved in downloading or installing the file. Additionally or alternatively, security module 112 may notify a user and/or administrator of the computing device that the file has been determined to be untrustworthy.

In some embodiments, the systems described herein may incorporate trustworthiness information about a suspicious file into one or more security policies. For example, in the event that determination module 110 determines that a file represents a security threat, security module 112 may generate a policy that restricts access to the file and/or that restricts behaviors of the file while the file runs on a computing device. Conversely, in the event that determination module 110 determines that a file does not represent a security threat, security module 112 may add the file to a whitelist of files that are allowed to be accessed by a computing device. In some examples, determination module 110 may send such policies to a remote security server (and/or direct the remote security server to generate the policies based on the obtained trustworthiness information). The security server may then enforce the security policies on multiple endpoint devices that implement security programs managed by the security server.

FIG. 4 illustrates an exemplary configuration of multiple endpoint devices managed by a security service. As shown in FIG. 4, a group of endpoint devices 406(1)-(N) may each execute an instance of a security program 408. In this example, security program 408 may include all or a portion of modules 102. While running on endpoint devices 406(1)-(N), security programs 408(1)-(N) may detect attempts by endpoint devices 406(1)-(N) to access one or more suspicious files. In response, security programs 408(1)-(N) may identify and access third-party resources 404(1)-(N) on servers 402(1)-(N) to obtain trustworthiness information about the suspicious files. Security programs 408(1)-(N) may access servers 402(1)-(N) via network 410 and/or any additional communication infrastructure.

As shown in FIG. 4, security programs 408(1)-(N) may also be in communication with a security database 412. After one or more of security programs 408(1)-(N) determines whether a suspicious file represents a security threat, the security program may send information about the file to security database 412. In some examples, security database 412 may then incorporate the information into one or more of security policies 414. After generating security policies 414, security database 412 may enforce security policies 414 on each of endpoint devices 406(1)-(N).

As explained above in connection with FIGS. 3 and 4, the systems and methods described herein may be implemented in a variety of ways and provide a number of advantages. In exemplary embodiments, the disclosed systems and methods may enable a security service on an endpoint device to identify and access third-party resources not associated with the security service to obtain information relevant to the trustworthiness of a suspicious file. As such, the systems and methods described herein may enable the security service to accurately and efficiently determine the trustworthiness of the file based on information relevant to the background, origin, or context of the file (i.e., without being limited to an analysis of only the content of the file and/or previously-identified security reputations stored within the security service).

Figure 5:
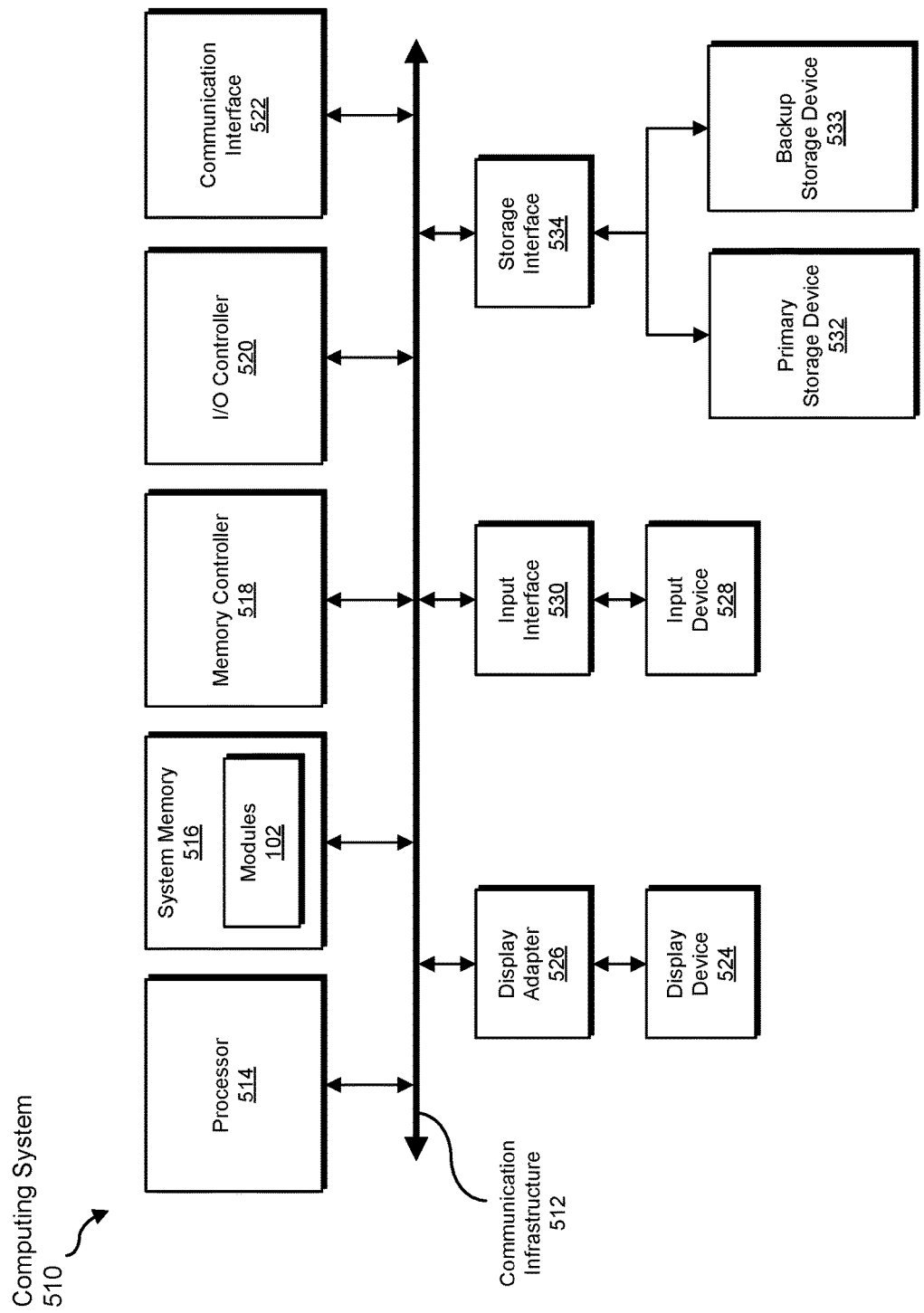
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510.

Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
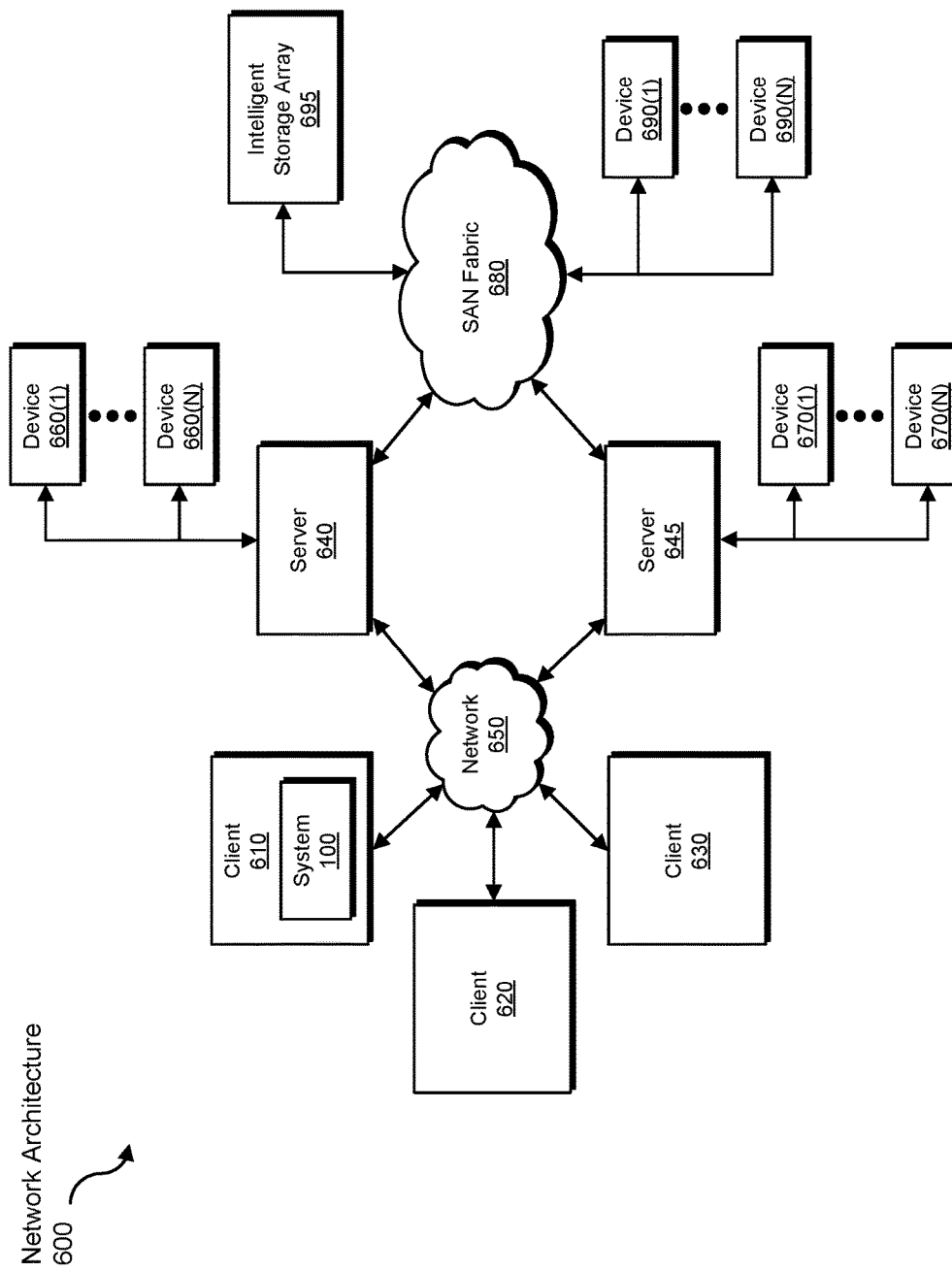
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for obtaining information about security threats on endpoint devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about an attempt to access a suspicious file, transform the information about the attempt to access the suspicious file into information indicative of the trustworthiness of the file, output a result of the transformation to a computing device that performed the attempt to access the suspicious file, use the result of the transformation to block or permit access to the suspicious file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for obtaining information about security threats on endpoint devices, at least a portion of the method being performed by a computing device comprising at least one processor, the method comprising:
   detecting, by a security program on the computing device, an attempt to access at least one suspicious file;
   before permitting the computing device to access the suspicious file:
      searching, by the security program, a security database utilized by the security program for information indicative of the trustworthiness of the suspicious file; and
      determining, by the security program, based on the search, that the security database does not store the information indicative of the trustworthiness of the suspicious file;
   in response to determining that the security database does not store the information indicative of the trustworthiness of the suspicious file:
      identifying, by the security program, at least one third-party resource that:
         is not associated with the security program; and
         is at least partially responsible for developing the suspicious file;
      determining, based on the third-party resource being at least partially responsible for developing the suspicious file, that the third-party resource potentially contains information about behaviors the suspicious file is expected to perform on the computing device;
      performing, by the security program, an online search for the third-party resource by identifying a server that is hosted by the third-party resource and potentially stores the information about the behaviors the suspicious file is expected to perform on the computing device; and
      accessing, by the security program, the server to obtain the information about the behaviors the suspicious file is expected to perform on the computing device;
   determining, by the security program based at least in part on the information about the behaviors the suspicious file is expected to perform on the computing device, whether the suspicious file represents a security threat to the computing device; and
   adding, by the security program, information to the security database that indicates whether the suspicious file represents the security threat.

2. The method of claim 1, wherein detecting the attempt to access the suspicious file comprises detecting an attempt to access a file whose trustworthiness is unknown.

3. The method of claim 1, further comprising determining that the third-party resource is at least partially responsible for developing the suspicious file based on the third-party resource being at least one of:
   a creator of the suspicious file;
   a publisher of the suspicious file; and
   a distributor of the suspicious file.

4. The method of claim 1, further comprising obtaining, from the server that is hosted by the third-party resource, information indicating that the suspicious file was created with malicious intent.

5. The method of claim 1, wherein obtaining the information about the behaviors the suspicious file is expected to perform on the computing device comprises crawling a web page hosted by the third-party resource.

6. The method of claim 1, wherein determining whether the suspicious file represents the security threat comprises determining that the suspicious file represents the security threat based on determining that the information obtained from the third-party resource indicates that the suspicious file is not trustworthy; and further comprising performing at least one security action on the suspicious file in response to determining that the suspicious file represents the security threat.

7. The method of claim 1, wherein determining whether the suspicious file represents the security threat comprises determining that the suspicious file does not represent the security threat based on determining that the information obtained from the third-party resource indicates that the suspicious file is trustworthy; and further comprising permitting the computing device to access the suspicious file in response to determining that the suspicious file does not represent the security threat.

8. The method of claim 1, wherein adding the information that indicates whether the suspicious file represents the security threat to the security database comprises prompting a remote security service that manages the security program to generate at least one security policy associated with the suspicious file that is to be implemented on at least one additional computing device.

9. A system for obtaining information about security threats on endpoint devices, the system comprising:

a detection module, stored in memory, that detects, as part of a security program on a computing device, an attempt to access at least one suspicious file;

an identification module, stored in memory, that before the computing device is permitted to access the suspicious file:

searches, as part of the security program, a security database utilized by the security program for information indicative of the trustworthiness of the suspicious file;

determines, as part of the security program, based on the search, that the security database does not store the information indicative of the trustworthiness of the suspicious file;

identifies, as part of the security program, in response to determining that the security database does not store the information indicative of the trustworthiness of the suspicious file, at least one third-party resource that:

is not associated with the security program; and
is at least partially responsible for developing the suspicious file; and determines, based on the third-party resource being at least partially responsible for developing the suspicious file, that the third-party resource potentially contains information about behaviors the suspicious file is expected to perform on the computing device;

an information module, stored in memory, that:

performs, as part of the security program, an online search for the third-party resource by identifying a server that is hosted by the third-party resource and potentially stores the information about the behaviors the suspicious file is expected to perform on the computing device; and accesses, as part of the security program, the server to obtain the information about the behaviors the suspicious file is expected to perform on the computing device;

a determination module, stored in memory, that determines, as part of the security program, based at least in part on the information about the behaviors the suspicious file is expected to perform on the computing device, whether the suspicious file represents a security threat to the computing device;

a security module, stored in memory, that adds, as part of the security program, information to the security database that indicates whether the suspicious file represents the security threat; and at least one processor configured to execute the detection module, the identification module, the information module, the determination module, and the security module.

10. The system of claim 9, wherein the detection module detects the attempt to access the suspicious file by detecting an attempt to access a file whose trustworthiness is unknown.

11. The system of claim 9, wherein the identification module determines that the third-party resource is at least partially responsible for developing the suspicious file based on the third-party resource being at least one of:

a creator of the suspicious file;
a publisher of the suspicious file; and
a distributor of the suspicious file.

12. The system of claim 9, wherein the information module further obtains, from the server that is hosted by the third-party resource, information indicating that the suspicious file was created with malicious intent.

13. The system of claim 9, wherein the information module obtains the information about the behaviors the suspicious file is expected to perform on the computing device by crawling a web page hosted by the third-party resource.

14. The system of claim 9, wherein the determination module determines whether the suspicious file represents the security threat by determining that the suspicious file represents the security threat based on determining that the information obtained from the third-party resource indicates that the suspicious file is not trustworthy; and further comprising a security module that performs at least one security action on the suspicious file in response to determining that the suspicious file represents the security threat.

15. The system of claim 9, wherein the determination module determines whether the suspicious file represents the security threat by determining that the suspicious file does not represent the security threat based on determining that the information obtained from the third-party resource indicates that the suspicious file is trustworthy; and further comprising a security module that permits the computing device to access the suspicious file in response to determining that the suspicious file does not represent the security threat.

16. The system of claim 9, wherein the security module adds the information that indicates whether the suspicious file represents the security threat to the security database by prompting a remote security service that manages the security program to generate at least one security policy associated with the suspicious file that is to be implemented on at least one additional computing device.

17. A non-transitory computer-readable medium comprising one or more computer-readable instructions that, when executed by at least one processor of a computing device, cause the computing device to:

detect, by a security program on the computing device, an attempt to access at least one suspicious file;

before permitting the computing device to access the suspicious file:

search, by the security program, a security database utilized by the security program for information indicative of the trustworthiness of the suspicious file; and determine, by the security program, based on the search, that the security database does not store the information indicative of the trustworthiness of the suspicious file;

in response to determining that the security database does not store the information indicative of the trustworthiness of the suspicious file:

identify, by the security program, at least one third-party resource that:
is not associated with the security program; and
is at least partially responsible for developing the suspicious file;

determine, based on the third-party resource being at least partially responsible for developing the suspicious file, that the third-party resource potentially contains information about behaviors the suspicious file is expected to perform on the computing device;

perform, by the security program, an online search for the third-party resource by identifying a server that is hosted by the third-party resource and potentially stores the information about the behaviors the suspicious file is expected to perform on the computing device; and access, by the security program, the server to obtain the information about the behaviors the suspicious file is expected to perform on the computing device; and determine, by the security program based at least in part on the information about the behaviors the suspicious file is expected to perform on the computing device, whether the suspicious file represents a security threat to the computing device; and add, by the security program, information to the security database that indicates whether the suspicious file represents the security threat.

18. The computer-readable medium of claim 17, wherein the one or more computer-readable instructions cause the computing device to detect the attempt to access the suspicious file by detecting an attempt to access a file whose trustworthiness is unknown.

19. The computer-readable medium of claim 17, wherein the one or more computer-readable instructions cause the computing device to determine that the third-party resource is at least partially responsible for developing the suspicious file based on the third-party resource being at least one of:
a creator of the suspicious file;
a publisher of the suspicious file; and
a distributor of the suspicious file.

20. The method of claim 1, wherein obtaining the information about the behaviors the suspicious file is expected to perform on the computing device comprises identifying an End User License Agreement (EULA) that describes behaviors the file performs while running.

* * * * *